(12) United States Patent
Kraft et al.

(10) Patent No.: US 7,729,850 B1
(45) Date of Patent: Jun. 1, 2010

(54) SYSTEM AND METHOD OF PROVIDING REAL-TIME ROAD CONSTRUCTION INFORMATION FOR VEHICLE TRIP PLANNING

(76) Inventors: Clifford H. Kraft, 320 Robin Hill Dr., Naperville, IL (US) 60540; Vasilios Dossas, 70 W. Huron St., Chicago, IL (US) 60610

( * ) Notice: Subject to any disclaimer, the term of this patent is extended or adjusted under 35 U.S.C. 154(b) by 835 days.

(21) Appl. No.: 10/674,151

(22) Filed: Sep. 29, 2003

Related U.S. Application Data

(60) Provisional application No. 60/415,122, filed on Sep. 30, 2002.

(51) Int. Cl.
*G01C 21/00* (2006.01)
(52) U.S. Cl. .................. 701/202; 701/208; 701/211
(58) Field of Classification Search ......... 701/200–202, 701/208, 211, 24, 25, 36, 117–119; 340/995.1, 340/991, 995.12, 995.13; 342/357.1, 357.13
See application file for complete search history.

(56) References Cited

U.S. PATENT DOCUMENTS

| | | | | |
|---|---|---|---|---|
| 5,806,018 A | * | 9/1998 | Smith et al. | 701/211 |
| 5,862,509 A | * | 1/1999 | Desai et al. | 701/209 |
| 6,064,318 A | * | 5/2000 | Kirchner et al. | 340/905 |
| 6,209,026 B1 | * | 3/2001 | Ran et al. | 709/218 |
| 6,404,880 B1 | * | 6/2002 | Stevens | 379/221.11 |
| 6,765,998 B2 | * | 7/2004 | Bruce et al. | 379/88.18 |
| 6,904,362 B2 | * | 6/2005 | Nakashima et al. | 701/211 |
| 7,257,426 B1 | * | 8/2007 | Witkowski et al. | 455/569.2 |

\* cited by examiner

*Primary Examiner*—Yonel Beaulieu
(74) *Attorney, Agent, or Firm*—Clifford Kraft

(57) ABSTRACT

A business system that allows vehicle telematics and other trip planning systems to be updated with latest road construction information. This information can be periodically downloaded to the trip planning system in order to factor in possible road construction delays into trip planning. The information can be gathered by direct observation or by periodic reports from governmental agencies. A subscription fee could be charged for this service.

15 Claims, 2 Drawing Sheets

SYSTEM AND METHOD OF PROVIDING REAL-TIME ROAD CONSTRUCTION INFORMATION FOR VEHICLE TRIP PLANNING

This application is related to, and claims priority from, U.S. Provisional patent application No. 60/415,122 filed Sep. 30, 2002. Provisional application 60/415,122 is hereby incorporated by reference.

BACKGROUND

1. Field of the Invention

The present invention relates to the field of on-board vehicle navigation systems and more particularly to a system and method of providing real-time road construction information to such systems.

2. Description of Prior Art

It is known in the art to provide on-board navigation systems for vehicles. These systems are usually based on a combination of GPS, gyro, vehicle steering, wheel, or odometer connections, and dead reckoning. It is very common to provide these systems with canned maps of various regions from common map suppliers. Presently these maps are supplied on CD-ROM.

Recently there has been considerable interest in the field of telematics where generally vehicle on-board systems communicate via wireless radio connections to the cellular telephone network or to local or wide area networks. It is envisioned that considerable information will be downloaded into vehicle on-board systems via such telematic systems.

It has been proposed that possibly up to date maps could be periodically downloaded via telematics systems to keep the map database for on-board navigation systems up to date. It has also been proposed that it might be possible in future telematics systems to download real-time traffic conditions into on-board navigation systems so that the system's advanced planning features could provide temporary routes around traffic jams.

What is needed however, whether maps are loaded offline from say CD-ROMs or online via wireless or other means is current road construction information. This would provide considerable help in planning trips whether by automatic means or manual means.

SUMMARY OF THE INVENTION

The present invention relates to a business system that can provides current road construction information to vehicle on-board telametrics systems and other trip planning systems including personal computers, laptops and PDAs. Generally, there is a number of vehicle telematics systems which usually display map information including overlays of highways. In the present invention, a central information gathering location for gathering road construction information for various vehicle routes can provide this road construction information to the telametrics systems from a central location allowing the telametrics systems to display the road construction information along with other map information. The method for updating the vehicle telametrics systems can be wireless such as cellular telephone, local area network or any other type of wireless network. Optionally, updates could be made by CD ROM, telephone modem or manually entered. The road construction information can contain information on number of lanes affected, construction work times, estimated delay times and the like. The provider of the road construction information can charge a fee, probably a periodic subscription fee for the update service.

The central update service can gather road construction information from either direct observation or more probably, from governmental agencies such as county, state and city road departments.

DETAILED DESCRIPTION OF THE INVENTION

The present invention relates to a business system and method for loading up to date road construction information into on-board navigation systems. There are several modes that the present invention can operate in: 1) construction information can be contained in the map database and loaded with the maps; 2) construction data can be periodically loaded as an overlay to the base maps; and 3) construction information can be loaded in real-time via a wireless interface. A subscription fee could be charged for this service.

Figure 1:
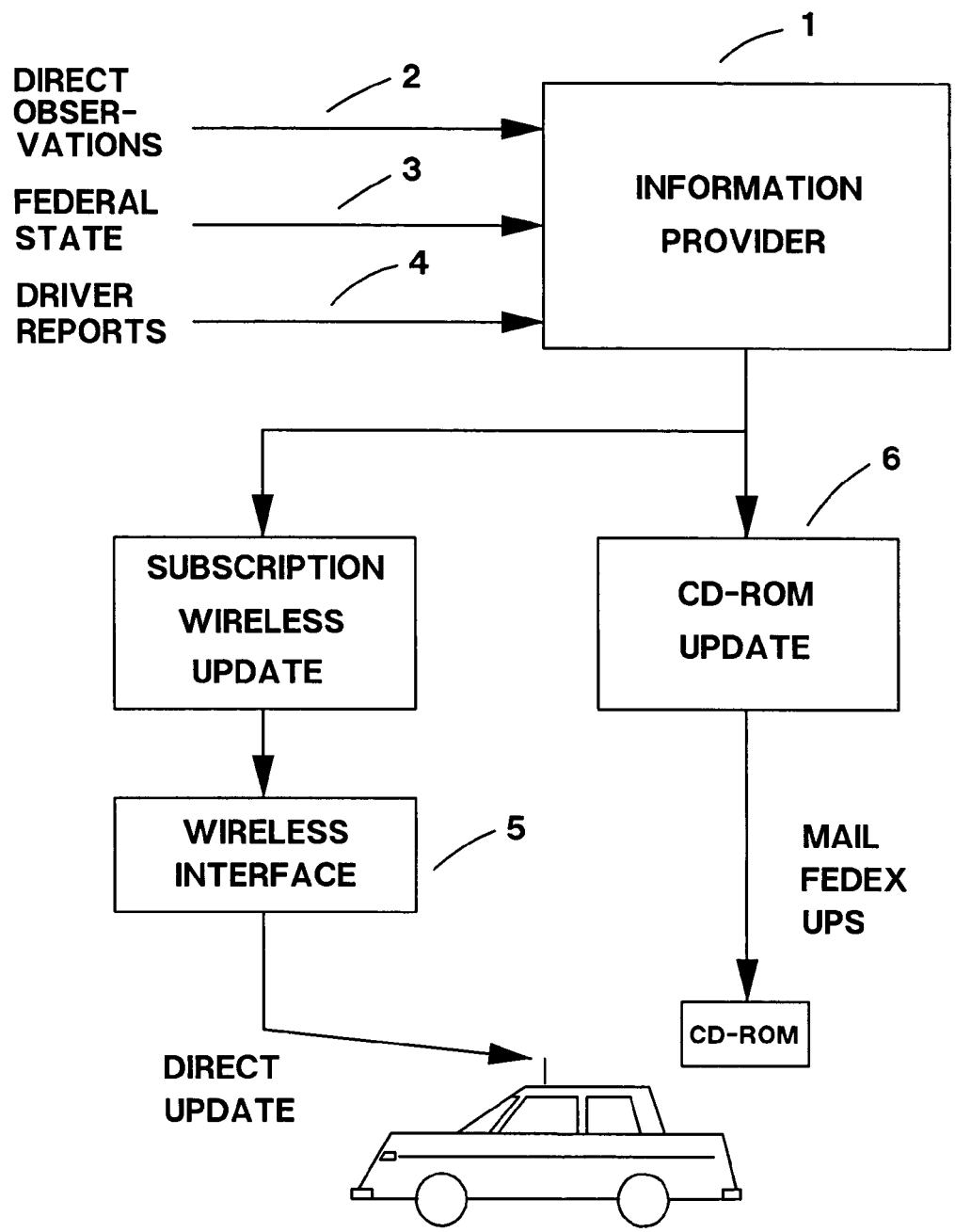
FIG. 1 shows schematically an overview of the present invention

An information provider 1 as shown in FIG. 1 can gather information by means of direct observations 2, governmental agencies 3 or from driver reports 4. The preferred mode of operation of the present invention is to load the road construction information into on-board navigation system via wireless download 5. It is not necessary that the on-board system be in continuous communication with the construction information supplier; however, for optimum results, the road construction information should be frequently updated. The preferred period is between about once a day to once a week or longer, or immediately before a trip is to be planned.

A possible embodiment of the present invention relates to a road construction information provider 1. Such a service could compile the latest information on highway construction projects from state agencies such as state, county or municipal road departments, state police or highway patrol, field observers either on the ground or in the air, driver reports, and by any other method of gathering information about road construction on major and minor highways.

The road construction information provider 1 could provide information in several different ways. The simplest way would be by a telephone call from a subscriber to the service. This could be a voice or data call where the subscriber would simply ask for the information. This could be supplied by a web site or by Email as well. Usually this data would be used for manual planning or for manual entry into an on-line navigation system.

The next more sophisticated way would be for the construction information provider to provide a periodic printout of road construction information for a given region by an automatic telephone call from an on-board computer via a wireless network to the information provider. The on-board computer system could request this information periodically, or the information provider could simply provide it by calling the vehicle periodically. A variation of this technique would be for the information to be broadcast in data or voice form periodically so that it could be entered into the on-board system by the subscriber.

A more sophisticated method would be for the vehicle on-board navigation system to either establish wireless contact or wait for such contact to be established and to automatically update itself whenever it needed road construction data, or periodically when updated information was available from the information provider. In fact, road construction information could be periodically or continuously broadcast on a special telematics channel of future wireless communication or cellular telephone systems.

An alternate update method could by distribution of CD ROMs 6 containing the latest road construction information. These could be combined with map updates.

A possible embodiment of the system and method of the present invention is for a service provider 1 to continually track road construction in an entire country or perhaps in a more limited geographic region. This road construction information provider could optionally track traffic conditions on all roads or on major highways such as interstates or autobahns. This provider, for a periodic subscription fee, would provide either a continuous broadcast of the latest road construction information and possibly optional traffic conditions if the necessary broadcast channels become available in the cellular telephone network or provide a calling service where all subscribers vehicles are periodically called by cellular telephone or any other wireless means for communicating with a vehicle. In any case, the subscriber's on-board navigation system (and any other system the user desired to be kept up to date such as a laptop or palm computer) would be kept up to date constantly, or at least at reasonable intervals.

With this embodiment of the present invention, the vehicle on-board navigation system (or trip planning system in a computer, laptop, or palm computer, for example, a PDA with wireless access) would be kept up to date on road construction and possible traffic. Whenever the subscriber desired to plan any kind of trip, the planning function could automatically take construction and possibly traffic conditions into account. It is envisioned that the subscriber could direct the trip planning equipment or program to ignore such information if desired, or to simply ignore part of the information, for example current traffic conditions if a trip was being planned for a later time. The subscriber could request the trip planner to lay out the shortest route, the fastest route under optimum conditions, the fastest route considering road construction but not traffic, and the fastest route considering road construction and current traffic conditions.

While knowledge of current traffic conditions is desirable and within the scope of the present invention, it should be recognized that it might also be very expensive and difficult for a service provider to keep a database updated with current traffic conditions over a wide geographic area such as the United States because of the amount of traffic and because of the rapidity with which traffic conditions change (for example, a single minor accident on an interstate can totally change traffic conditions in a few minutes). On the other hand, road construction conditions do not change that rapidly. Updates every few days or even weeks would many times be sufficient (although more frequent or even continuous updates, as well as fewer updates, are within the scope of the present invention). The service provider could also make more frequent updates on road construction on major highways and less frequent updates on road construction on more minor roads. Also, while desirable, it is not necessary that all road construction in metropolitan areas be continuously tracked. In order to keep the cost of the service reasonable, it is within the scope of the present invention to optionally track only road construction on major arteries or streets in cities.

Figure 2:
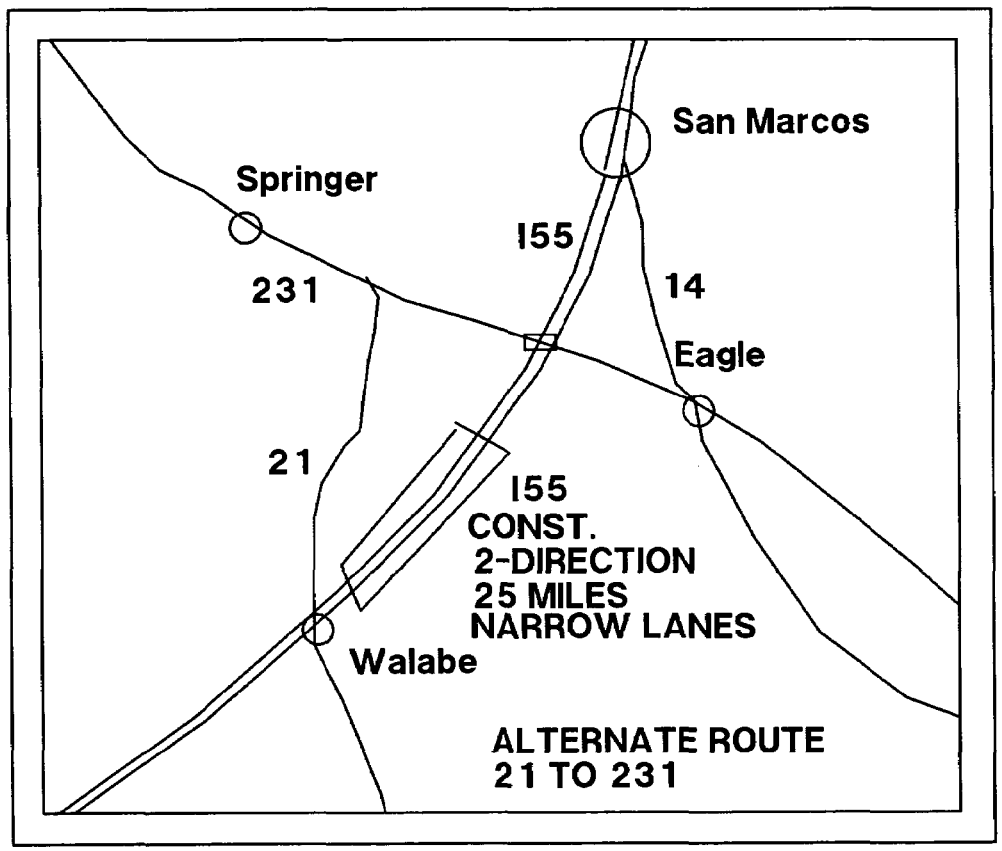
FIG. 2 shows a map display with road construction shown on an interstate highway.

A vehicle on-board telematics or trip planning system can contain and display road maps. Construction information could be presented as an overlay to the display of highways on such map systems. FIG. 2 shows a display of a road map where stretches of an interstate are under construction. Data inserts could be displayed that indicate the severity of the construction such as the number of lanes affected, whether both directions are under construction or only one direction, and possibly the severity of any slowdown or delay.

The present invention has been presented by means of various descriptions and illustrations. The present invention is not limited to these descriptions or illustrations or to the embodiments shown. One of skill in the art will realize that many changes and variations are within the scope of the present invention.

We claim:

1. A system for providing road construction information to vehicle on-board telematics systems comprising:
   at least one telemetric system in a vehicle, said telemetric system displaying map information;
   a central information gathering location for gathering road construction information for vehicle routes, said road construction information being at least partially supplied by a government agency;
   a communication system providing said road construction information from said central information gathering location to said telematics system, wherein said telematics system displays said road construction information and said map information.

2. The system of claim 1 wherein said means for providing said road construction information to said telematics systems is wireless.

3. The system of claim 1 wherein said construction information is displayed on said map information.

4. The system of claim 2 wherein said wireless means is a local area network.

5. The system of claim 1 wherein said road construction information further contains information on number of lanes affected.

6. The system of claim 1 wherein said road construction information further contains information on construction work times.

7. The system of claim 1 wherein a fee is charged for said road construction information.

8. The system of claim 7 wherein said fee is a periodic subscription fee.

9. A method of providing for wide area trip planning with a telemetrics system located in a vehicle comprising the steps of:
   receiving road construction information from at least one governmental agency for a plurality of routes;
   transmitting said road construction information system to said telemetrics system
   causing said road construction information to be displayed in a vehicle and causing map information to be displayed in the vehicle wherein said construction information includes number of lanes affected and times when said lanes are affected by said construction.

10. The method of claim 9 wherein said times include work start and stop times.

11. The method of claim 9 wherein the step of transmitting is by cellular telephone.

12. The method of claim 9 further comprising said telemetrics system presenting information relating to said road construction in text form.

13. A system for long distance trip planning comprising a computer, a storage device, and a communications sub-system wherein said computer receives reports of road construction sites through said communications sub-system and stores said reports in said storage device, said computer then displaying map information and construction information.

14. The system of claim 13 wherein said computer is mounted in a vehicle.

15. The system of claim 13 wherein said communications sub-system includes cellular telephone.

* * * * *

UNITED STATES PATENT AND TRADEMARK OFFICE
CERTIFICATE OF CORRECTION

| | | |
|---|---|---|
| PATENT NO. | : 7,729,850 B1 | Page 1 of 1 |
| APPLICATION NO. | : 10/674151 | |
| DATED | : June 1, 2010 | |
| INVENTOR(S) | : Clifford H. Kraft and Vasilios Dossas | |

It is certified that error appears in the above-identified patent and that said Letters Patent is hereby corrected as shown below:

Col. 1, Line 48 should read "The present invention relates to a business system that" rather than "The present invention relates to a business that can".

Col. 1, Line 50 The word "telemetrics" should be "telematics".

Col. 1, Line 57 The word "telemetrics" should be "telematics".

Col. 1, Line 59 The word "telemetrics" should be "telematics".

Col. 4, Line 7 should read "at least one telematic system in a vehicle, said telematic" rather than "at least one telemetric system in a vehicle, said telemetric".

Col. 4, Line 36 The word "telemetrics" should be "telematics".

Col. 4, Line 41 The word "telemetrics" should be "telematics".

Col. 4, Lines 51-52 The word "telemetrics" should be "telematics".

Signed and Sealed this
Eighth Day of February, 2011

David J. Kappos
*Director of the United States Patent and Trademark Office*